March 9, 1937.   H. J. SAUER   2,073,074
VEHICLE LAMP
Filed March 2, 1935
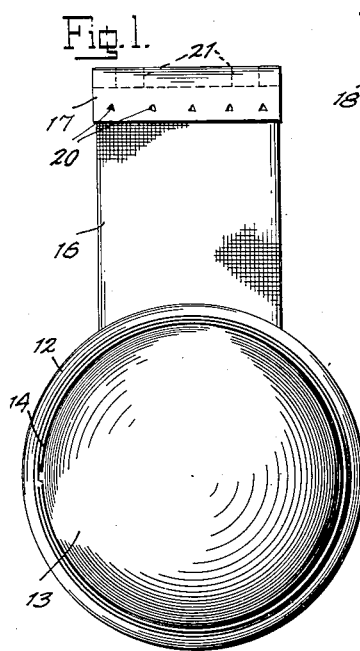
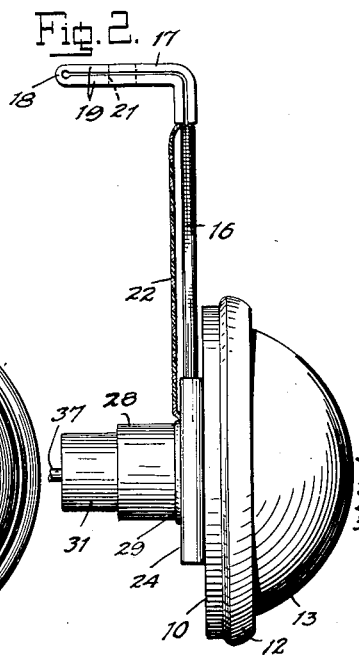
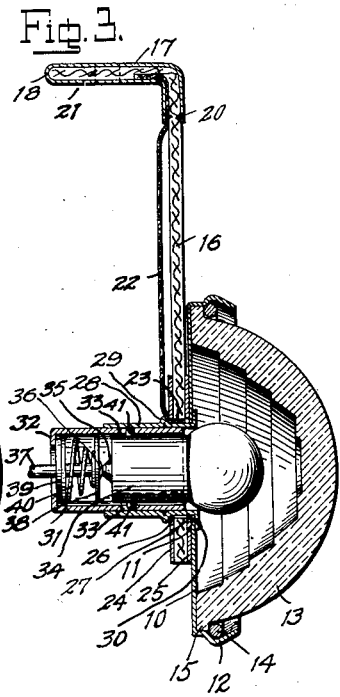
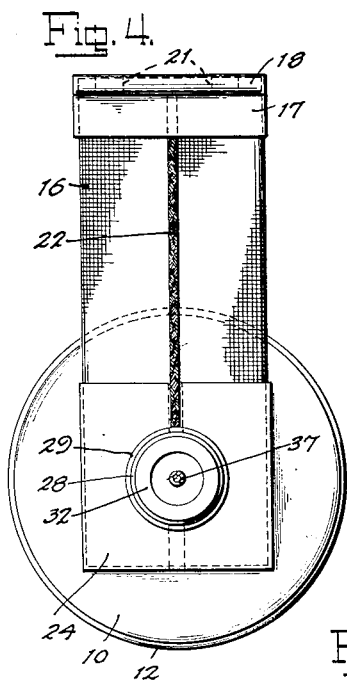
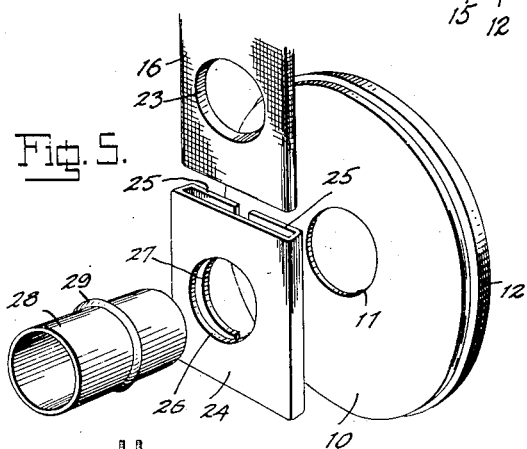
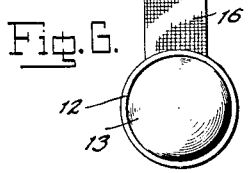
INVENTOR
HENRY J. SAUER.
BY
ATTORNEY Patented Mar. 9, 1937

2,073,074

UNITED STATES PATENT OFFICE 2,073,074

VEHICLE LAMP

Henry J. Sauer, Fairfield, Conn., assignor to The Kilborn-Sauer Company, Fairfield, Conn., a corporation of Connecticut Application March 2, 1935, Serial No. 9,043

3 Claims. (Cl. 240—8.3)

The present invention relates to an improved vehicle lamp and particularly a flexibly mounted lamp for use especially on trucks as a tail or clearance lamp, and also as an emergency lamp to be placed on a projecting load carried upon the truck, as for instance projecting pipes or beams. The flexible mounting of the lamp not only protects it against breakage in case it is bumped into, but also permits the lamp to vibrate or swing while the vehicle is in motion, thus increasing its warning effect.

An object of the invention is to provide a lamp structure in which the main parts may be conveniently assembled by a single operation, without the use of screws or rivets. Another object is to provide a lamp structure having a flexible mounting strap which may be in the form of a woven strip, as for instance, brake-lining material, having its edges parallel and finished, as distinguished from cut edges, so that breaking or unraveling of the edge due to rough handling is prevented.

With the above and other objects in view an embodiment of the invention is shown in the accompanying drawing, and this embodiment will be hereinafter more fully described with reference thereto, and the invention will be finally pointed out in the claims.

In the drawing:

Fig. 2 is a front elevation of a vehicle lamp, according to the exemplary illustrated embodiment of the invention.

Fig. 2 is a side elevation.

Fig. 3 is a vertical sectional view.

Fig. 4 is a rear elevation.

Fig. 5 is a perspective view showing the main parts in separated relation prior to assembly.

Fig. 6 is a front elevation of a modification having an attaching band.

Referring to the drawing, the vehicle lamp, according to the exemplary illustrated embodiment of the invention, comprises a lamp back or casing member 10 having a central aperture 11 and a forwardly bent slightly convergent rim 12 adapted to receive the lens 13, which latter is removably secured by a split spring ring 14 engaged over the edge flange 15 of the lens and held in place by the slight convergence of the rim 12.

The flexible mounting strap 16, which may conveniently be formed of a length of ordinary commercial brake lining, preferably having both of its parallel side edges finished or selvage edges as distinguished from cut edges, is secured at its upper end in a right angle shaped bracket 17 folded about the upper end edge of the strap so that the bight 18 of the fold encloses the upper end edge of the strap, the side edges of the bracket being preferably bent over the side edges of the strap, as at 19, to more securely retain it. The bracket is secured to the strap by indenting, as at 20, or it may be riveted or otherwise suitably secured. Holes 21—21 for receiving attaching screws are provided in the horizontal portion of the bracket. The upper end of a ground wire 22, preferably in the form of flexible braid, is inserted and secured in the bracket as the latter is clamped over the strap end. In the lower end of the strap 16 there is provided an aperture 23 corresponding to and adapted to register with the aperture 11 of the casing 10. A metal clip member 24 is engaged about the lower end of the strap, being provided with folded flaps 25—25 bent inwardly and arranged to be disposed between the strap and the casing in the assembled relation. An aperture 26 in the clip member 24 and a corresponding aperture 27 in the edges of the flaps 25—25, register with the aperture 23 in the strap.

A tubular socket supporting member 28 having an upset or swaged annular bead 29 intermediate its ends is inserted through the apertures 26, 23, 27, and 11 of the clip member, strap and casing, and its end is spun outwardly upon the casing to form a flange 30, between which and the bead 29 the clip member, strap, and casing are securely clamped and held together upon the tubular member 28. The lower end of the ground wire 22 is also secured to the tubular member 28 by the same assembling operation, being inserted in the aperture 26 of the clip member and being securely clamped between this member and the bead 29, as clearly shown in Fig. 3.

A tubular lamp socket 31, having its outer end flanged inwardly at 32 and provided at its inner end with a pair of bayonet slots 33—33, is inserted in the tubular supporting member 28 and secured by welding or soldering, and is adapted to receive the lamp base 34. The center contact 35 of the lamp engages the button end 36 of a lead wire 37, this button end carrying an insulating washer 38 between which and a slidably mounted insulating washer 39 abutting the flange 32 a spring 40 is disposed, the lamp contact 35 being thus engaged by the button end 36 under spring pressure and the lugs 41—41 of the lamp base being yieldably retained in the bayonet slots 33—33. The base of the lamp is electrically connected to the ground wire through the tubular socket 31 and support 28, the ground wire being grounded to the vehicle body through the bracket 17.

While I have illustrated a single contact lamp bulb having a single lead wire 37 and a ground wire 22 connected between the lamp socket and the bracket 17, it will be understood that I may if desired employ a double contact lamp bulb, in which case a double lead wire will extend to the socket in the usual manner instead of the single lead wire 37.

In Fig. 6 I have shown an attaching band 42 secured to the bracket 17, the two sides of the band adapted to be clamped about a supporting structure on the vehicle by a bolt and nut connection 43. In the case of a truck carrying projecting pipes, beams, or the like the band 42 may be conveniently clamped thereon. A flexible strap having a buckle or other suitable band means may be employed instead of the band 42. A double contact lamp bulb will preferably be used in this embodiment.

I have illustrated and described a preferred and satisfactory embodiment of my invention, but it will be obvious that changes may be made therein, within the spirit and scope thereof as defined in the appended claims.

Having thus described my invention what I claim and desire to secure by Letters Patent is:

1. A flexibly mounted vehicle lamp comprising a lamp casing having a back portion and a rim portion, said back portion having an aperture therein, a lens carried by said casing, a flexible strap member having an aperture near its lower end adapted to register with said aperture of said casing, a clip member embracing and enclosing the vertical edges of the lower apertured end of said strap member comprising a tubular member of rectangular cross section, two opposed sides of which are apertured to register with the apertures of said strap member and casing and the other two opposed sides of which enclose said vertical edges of said strap member, a tubular socket supporting member engaged through said apertures of said strap member, said clip member and said casing and securing them together, a lamp socket mounted in said tubular member, and means secured to said strap member for attaching the same to a vehicle.

2. A flexibly mounted vehicle lamp comprising a lamp casing having a back portion and a rim portion, said back portion having an aperture therein, a lens carried by said casing, a flexible strap member having an aperture near its lower end adapted to register with said aperture of said casing, a clip member embracing and enclosing the vertical edges of the lower apertured end of said strap member comprising a tubular member of rectangular cross section, two opposed sides of which are apertured to register with the apertures of said strap member and casing and the other two opposed sides of which enclose said vertical edges of said strap member, a tubular socket supporting member engaged through said apertures of said strap member, said clip member and said casing having an annular projection intermediate its ends disposed at the outer side of said clip member and having its end engaged through said aperture of said casing flanged over upon said casing to clamp and secure said strap member, clip member and casing together, a lamp socket mounted in said tubular member, and means secured to said strap member for attaching the same to a vehicle.

3. A flexibly mounted vehicle lamp comprising a lamp casing having a back portion and a rim portion, said back portion having an aperture therein, a lens carried by said casing, a flexible non-metallic strap member having an aperture near its lower end adapted to register with said aperture of said casing, a metallic clip member embracing the lower apertured end of said strap member and apertured to register with the apertures of said strap member and casing, a metallic tubular socket supporting member engaged through said apertures of said strap member, said clip member and said casing having an annular projection intermediate its ends disposed at the outer side of said clip member and having its end engaged through said aperture of said casing flanged over upon said casing to clamp and secure said strap member, clip member and casing together, a lamp socket mounted in said tubular member, a metallic bracket member secured to said strap member for attaching the same to a vehicle, and a flexible metallic ground wire clamped at one end between said tubular member and said clip member and secured at its other end to said bracket member.

HENRY J. SAUER.